United States Patent [19]

Mason

[11] 4,253,925

[45] Mar. 3, 1981

[54] METHOD AND APPARATUS FOR CATALYTIC DISSOCIATION OF NO

[75] Inventor: David M. Mason, Los Altos, Calif.

[73] Assignee: The Board of Trustees of the Leland Stanford Junior University, Stanford, Calif.

[21] Appl. No.: 86,635

[22] Filed: Oct. 22, 1979

[51] Int. Cl.³ .......................... C25B 1/02; C25B 9/00
[52] U.S. Cl. .................................. 204/129; 204/130; 204/272; 204/277; 204/278
[58] Field of Search ............... 204/129, 272, 275–278, 204/130

[56] References Cited

U.S. PATENT DOCUMENTS

| 4,131,514 | 12/1978 | Chong et al. | 204/129 |
| 4,134,818 | 1/1979 | Pebler et al. | 204/195 S |

Primary Examiner—R. L. Andrews
Attorney, Agent, or Firm—Donovan J. DeWitt

[57] ABSTRACT

Oxygen bearing compounds, such as those contained in exhaust gases from an internal combustion engine, including NO and $NO_2$ ($NO_x$), CO, $CO_2$ and $SO_2$ are catalytically decomposed by use of a solid electrolyte comprising a stabilized oxygen-ion oxide. The electrolyte is in the form of a thin member, or film, across the thickness dimension of which an electric field is applied by use of electrodes at opposite faces thereof. A d-c voltage source is connected to the electrodes for generation of a unidirectionalelectric field through the electrolyte. In accordance with the present invention, means are provided for limiting current drain from the voltage source to a negligable amount such that catalytic dissociation is effected substantially without the consumption of electrical power.

14 Claims, 4 Drawing Figures

METHOD AND APPARATUS FOR CATALYTIC DISSOCIATION OF NO

ORIGIN OF INVENTION

The invention described herein was made in the course of work under a grant or award from the National Science Foundation.

PRIOR ART

Prior art references showing the state of the art include:

(A) An article entitled "Catalytic Decomposition of Nitric Oxide on Zirconia by Electrolytic Removal of Oxygen" by S. Pancharatram, R. A. Huggins, and D. M. Mason, Journal of Electrochemical Society 122 (1975), pages 869-875; and (B) An article entitled "Design of High-Temperature Solid-electrolyte Fuel-cell Batteries for Maximum Power Output per Unit Volume" by E. F. Sverdrup, C. J. Warde and R. L. Eback, Energy Conversion, Vol. 13 (1973) pages 129-141.

BACKGROUND OF THE INVENTION

The catalytic dissociation of oxygen-bearing gaseous compounds employing a solid electrolyte having high oxygen-ion conductance is known as disclosed, for example, in article (A) above. The electrolyte comprises a stabilized oxygen-ion oxide such as scandia-stabilized zirconia. Porous electrodes are provided at opposite faces of the electrolyte, and a d-c potential is applied thereto for the formation of F-centers (trapped electrons) in the electrolyte at the cathode and V-centers (trapped holes) in the electrolyte at the anode. The oxygen-bearing gaseous compound to be dissociated is passed along the cathodic surface of the electrolyte while the opposite, anodic, surface is exposed to air. Dissociation of the gaseous oxygen-bearing compounds takes place at the cathodic surface of the electrolyte for the production of oxygen which, in ionic form, is pumped through the electrolyte by the applied electric field thereacross. The rate of decomposition at the surface of the electrolyte depends upon the concentration of F-centers thereat. Prior art methods depend upon increased current flow for increasing the production of F-centers and thereby to increase the rate of decomposition of the gaseous oxygen-bearing compound. The large power requirements are of particular disadvantage where the method is employed in vehicle exhaust systems for treating exhaust gases of internal combustion engines, and the like, for the removal of nitrogen oxides and carbon monoxide therefrom.

It now has been found that the above-described catalytic decomposition process may be effected with the expenditure of substantially no electrical power.

SUMMARY OF THE INVENTION AND OBJECTS

An object of this invention is the provision of improved method and means for catalysis of dissociation of oxygen-bearing gaseous compounds on solid oxygen-ion electrolytes by imposed electrical potential substantially without the consumption of power from the source of electrical potential.

Another object of this invention is to provide a catalytic dissociation method and apparatus of the foregoing type which is well adapted for the catalytic dissociation of $NO_x$ contained in exhaust gases from internal combustion engines thereby reducing nitrogen oxide emissions into the atmosphere.

The above and other objects and advantages of this invention are achieved by use of a solid electrolyte of the stabilized oxygen-ion oxide type, such as scandia-stabilized zirconia, across which a unidirectional electric field is applied by use of a d-c voltage source connected to electrodes provided at opposite surfaces of the electrolyte. The oxygen-bearing gaseous compound to be dissociated is passed along the cathodic surface of the electrolyte while air is provided at the opposite, anodic, surface thereof. The gaseous oxygen-bearing compound dissociates at the cathodic surface of the solid electrolyte and oxygen, in ionic form produced thereat by such dissociation, is pumped through the electrolyte by the applied electric field thereacross. Means, such as a large current-limiting resistor in series circuit with the d-c voltage source, are provided to limit the current drain from the source to a negligible amount. As a result, the catalytic dissociation takes place with substantially no consumption of power from the d-c source.

The invention, as well as other objects and advantages thereof, will become apparent from the following detailed description considered with the accompanying drawings.

BRIEF DESCRIPTION OF DRAWINGS

In the drawings, wherein like reference characters refer to the same parts in the several views.

Figure 1:
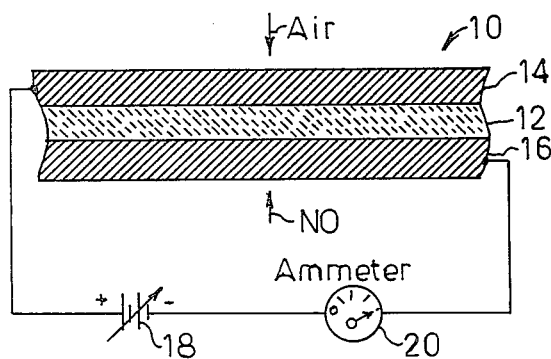
FIG. 1 is a fragmentary sectional view of a portion of a prior art catalytic reactor for catalytic dissociation of gaseous oxygen-bearing compounds.

Reference first is made to FIG. 1 wherein there is shown a fragmentary portion of a prior art catalytic reactor 10 of the type disclosed in the above-identified article entitled "Catalytic Decomposition of Nitric Oxide on Zirconia by Electrolytic Removal of Oxygen", the entire disclosure of which article specifically is incorporated by reference herein. In the simplified showing of FIG. 1 the prior art reactor 10 comprises a solid electrolyte 12 with porous electrodes 14 and 16 at opposite faces thereof. The electrolyte 12 comprises an 8 mole percent (M/O) scandiastabilized zirconia member 1 mm thick. The one electrode 14 comprises porous platinum, and the other electrode 16 comprises either porous platinum or porous gold, which electrodes are deposited on the electrolyte, as by evaporation.

A source of d-c potential 18 is connected across the electrolyte 12 through the electrodes 14 and 16 and an ammeter 20. The polarity is such that the one electrode 14 comprises the reactor anode, and the other electrode 16 the reactor cathode. The cathodic face of the solid electrolyte 12 is exposed to the oxygen-bearing compound, here nitric oxide (NO), to be electrocatalyzed, and the other face is exposed to air. Catalysis occurs at the cathodic surface of the electrolyte 12 for decomposition of the NO to molecular nitrogen and oxygen.

Such catalysis occurs with a potential above 1 v applied across the solid electrolyte 12. As indicated by ammeter 20, current flows through the battery circuit, which current increases as catalysis is increased. That is, a current flow directly related to the number of moles of NO decomposed was observed to flow. With such an arrangement, a substantial power consumption would be required for decomposing, say, all of the NO included in the exhaust gases of an internal combustion engine. The present invention is directed to method and apparatus for catalytic dissociation of the above-identified type but which avoids electrical power consumption.

Figure 2:
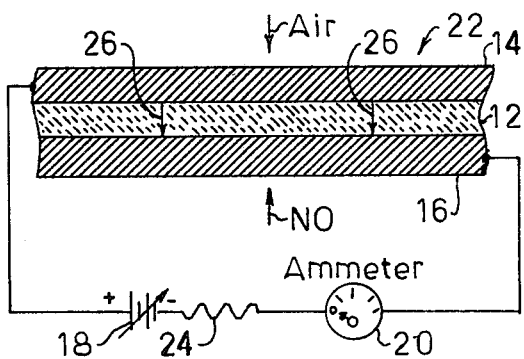
FIG. 2 is a view which is similar to that of FIG. 1 but illustrating the present invention.

Reference now is made to FIG. 2 of the drawings wherein a catalytic reactor 22 is shown which embodies the present invention. The illustrated reactor 22 is of the same construction as reactor 10, shown in FIG. 1, except for the inclusion of a large current-limiting resistor 24 in series circuit with the d-c potential source 18. The resistance value of the resistor is not critical, but is sufficiently large to limit current flow from the source to a negligible amount. Resistance on the order of, say, one or more megohms may be employed. As indicated by meter 20, there is substantially no current drain from the d-c source 18, yet decomposition of the NO at the cathodic surface of the electrolyte 12 proceeds at a comparable rate to that of the prior art arrangement of FIG. 1 which requires current flow. Contrary to prior art teachings, no net current flow through the electrolyte is required for catalysis. It is believed that F-centers which act as catalytic sites are created at the cathodic surface of the electrolyte by the electrical field 26 provided by connection of the d-c source 18 to the electrodes 14 and 16 through the large resistance resistor 24. Consequently, no net current flow in the circuit for oxygen-ion "pumping" is required. The above-described prior art and present invention cathodic decomposition method are best effected at elevated temperatures of, say, between 400° to 1000° C. where electrical conductivity of the electrolyte 12 ranges between approximately $10^{-3}$ to $10^{-1}$ 1/ohm-cm. At ambient temperature the low conductivity of the electrolyte substantially precludes useful operation of the reactor.

In the case of electrocatalysis of nitric oxide at the cathodic surface of the electrolyte, the decomposition thereof is as follows:

$$2NO \rightarrow N_2 + O_2 \qquad (1)$$

To the extent that current flow is involved, the overall stoichiometry of reactions at the cathodic and anodic faces of the electrolyte involving oxygen may be simply represented by the equation:

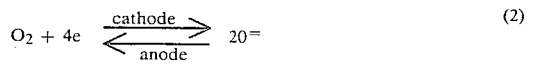

$$O_2 + 4e \underset{\text{anode}}{\overset{\text{cathode}}{\rightleftarrows}} 2O^= \qquad (2)$$

With the present invention, wherein only a small net current flows, substantially all oxygen produced by the decomposition of NO exits the reactor from the cathodic face of the electrolyte 12 without transfer through it. This is in sharp contrast to the illustrated prior art arrangement shown in FIG. 1 wherein substantially 100% of the oxygen produced by the decomposition of NO is "pumped" through the electrolyte for exiting at the anodic, air, side of the electrolyte of reactor 10.

The invention is not limited to use of the above-mentioned scandia-stabilized zirconia as the electrolyte. Numerous stabilized oxygen-ion oxides are known which may be employed as the solid electrolyte 12. These include, but are not limited to, $ZrO_2$— 8 mol% $ScO_3$; $ZrO_2$— 1 mol% $Y_2O_3$; $ZrO_2$— 15 mol% CaO; $CeO_2$— 5 mol% $Y_2O_3$ $CeO_2$— 10 mol% CaO; $CeO_2$— 9 mol% $Gd_2O_3$; $CeO_2$— 16 mol% $Gd_2O_3$— 4 mol% MgO; $Bi_2O_3$— 25 mol% $WO_3$, and; $Bi_2O_3$— 20 mol% SrO, all of which include F-centers in the body thereof.

Similarly, the invention is not limited to use of the above-mentioned porous platinum or gold electrodes. Due to the high resistivity of the solid electrolyte, electron-collecting electrodes are required at the opposite faces thereof, which electrodes are porous for exposure of the opposite cathodic and anodic electrolyte faces to the respective oxygen-bearing gaseous compound and air. Since the ionic-conducting electrolyte is catalytic, electrodes employed therewith need not be catalytic. Consequently, numerous metals which are good electrical conductors may be employed as electrodes including inexpensive non-noble metals.

Since the catalytic dissociation method and apparatus of the present invention requires no net current flow through the electrolyte, the invention is well adapted for use in the dissociation of oxygen-bearing compounds contained in exhaust gases from internal combustion engines. As is well understood, major components of such exhaust gases include $NO_x$, $O_2$, $H_2CO$, Hydrocarbons, $H_2O$, $CO_2$ and $N_2$. The nitrogen oxides i.e. NO and $NO_2$, and CO comprise major undesirable air pollutants. The removal of $NO_x$ from exhaust gases is particularly difficult, and numerous solutions to the removal problem have been suggested. As noted, the present invention is well adapted for such use.

Figure 3:
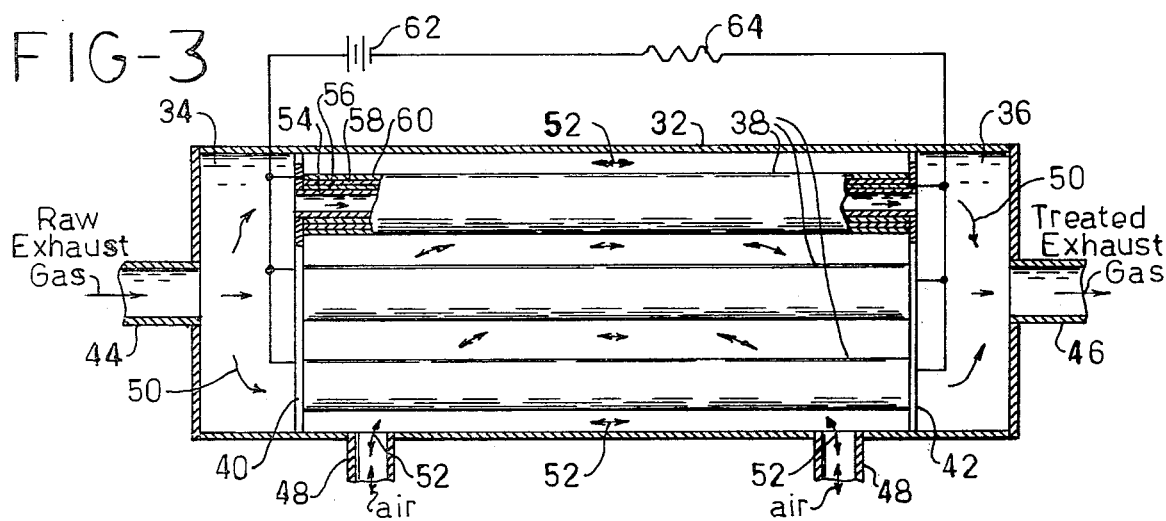
FIG. 3 is a longitudinal sectional view of a catalytic converter of the type which may be used in an exhaust system of an internal combustion engine for catalytic dissociation of $NO_x$ and CO.

Reference now is made to FIG. 3 wherein a catalytic reactor 30 is shown which is suitable for use in an exhaust gas system of an internal combustion engine for the catalytic decomposition of $NO_x$ and CO contained in the exhaust gases. The reactor includes a tubular casing 32 formed with exhaust gas inlet and outlet manifolds 34 and 36, respectively, at opposite ends thereof. A plurality of reactor elements 38 extend between inner manifold walls 40 and 42. Exahust gas inlet 44 and outlet 46 at the inlet and outlet manifolds communicate with the combustion chambers of an internal combustion engine, not shown, and the atmosphere, respectively. Also, one or more air passageways 48 are provided at the side of the casing 32 for exposure of the outer faces of the reactor elements 38 to the atmosphere. Exhaust gas flow through the inlet and outlet manifolds and reactor elements 38 is indicated by arrows 50, and air flow through passageways 48 and over the outside of the reactor elements 38 is indicated by arrows 52.

The reactor elements 38, which may be of the same construction, each comprise a support tube 54 supported at opposite ends by the manifold walls 40 and 42. The inlet and outlet manifolds 34 and 36 communicate with all of the central openings of the support tubes for the flow of exhaust gases therethrough. The support tubes 54 are made of a porous material through which the exhaust gases readily pass. Suitable support material includes any of the stabilized oxygen-ion oxides mentioned above. Porous calcia-stabilized zirconia, for example, which is relatively inexpensive, is well suited for the support tubes. The porous tubes simply comprise supporting means for the solid electrolyte and associated electrodes of the reactor elements, and do not enter into the novel catalytic dissociation process.

The reactor components include a porous cathodic electrode 56 disposed on the porous support tube, a non-porous, solid, stabilized oxygen-ion oxide electrolyte 58 on the electrode 56, and a porous anodic electrode 60 on the electrolyte 58. Any of the above-mentioned solid electrolyte and porous electrode materials may be employed in the construction of the reactor elements. A d-c potential is applied across the electrolyte by connection of the electrodes to a d-c voltage source 62 through a high resistance resistor 64, with the exhaust gas electrode 56 comprising the cathode and the air electrode 60 the anode. In the drawings a shunt connection to the reactor elements is shown. If desired, the reactor elements may be connected in electrical series circuit. In any case, a large current-limiting resistor 64, with a value of, say, one or more, megohms, is included in the d-c supply circuit to limit current drain to, say, within a microampere range. A thin solid electrolyte 58 layer on the order of say 20–50 μm may be employed to limit the electrical resistance thereof. With this arrangement nitric oxide included in the exhaust gases is reduced to $N_2$ and $O_2$ as indicated by equation (1). Decomposition of oxidized nitric oxide:

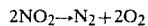

$$2NO_2 \rightarrow N_2 + 2O_2 \qquad (3)$$

and of carbon monoxide:

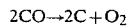

$$2CO \rightarrow 2C + O_2 \qquad (4)$$

also take place for at least partial purification of the exhaust gases. The illustrated converter may be preceded or followed by one or more catalytic converter stages for removal of other pollutants such as hydrocarbons, therefrom, in any conventional manner.

Figure 4:
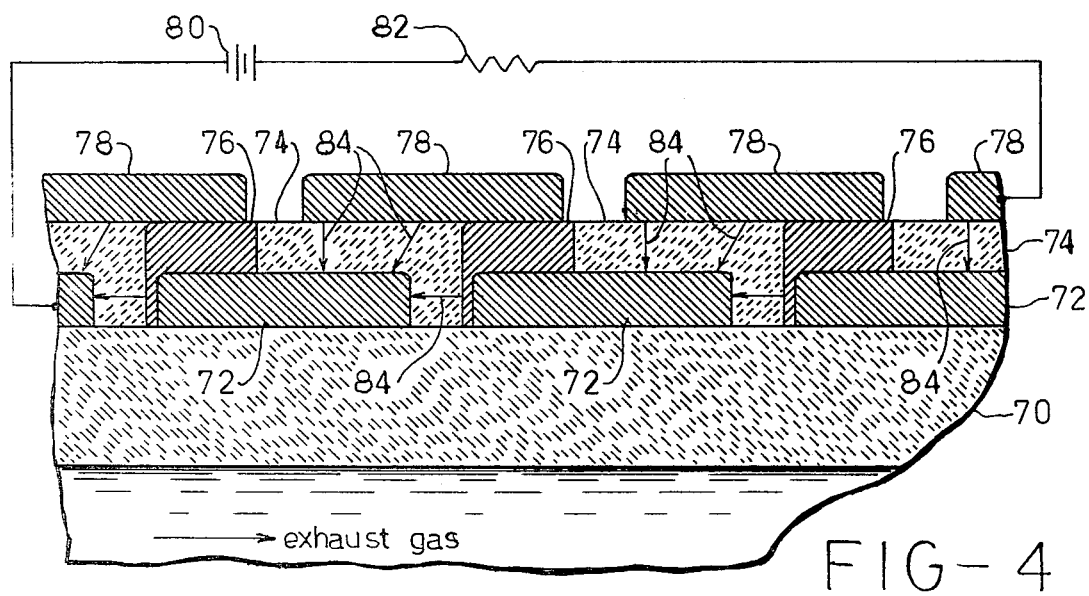
FIG. 4 is a fragmentary sectional view of a modified form of this invention employing therein a catalytic reactor of a construction used in prior art fuel cells.

The reactor elements employed in the present invention are not limited to the design shown in FIG. 3. In FIG. 4, to which reference now is made, a modified form of reactor element is shown. The reactor element shown therein is of identical design to the thin-film fuel-cell battery shown in the above-identified prior art article "Design of High-temperature Solid-electrolyte Fuel-Cell Batteries for Maximum Power Output per Unit Volume", the entire disclosure of which article specifically is incorporated by reference herein. Briefly, the reactor element comprises a porous support tube 70 with a plurality of spaced annular porous electrodes 72 composed, for example, of nickel or cobalt-zirconia cermets. Annular solid electrolytes 74, such as scandia-stabilized zirconia, partially cover the electrodes 72 and a major portion of the area therebetween. Interconnections 76 are located between the spaced electrolytes 74 on the electrodes 72 for electrically connecting the electrodes to spaced porous air electrodes 78 which overlap adjacent electrodes 72. It will be seen that the electrodes are connected in series electrical circuit. In the fuel cell battery disclosed in the above identified article, a plurality of such battery tubes are included in a manner similar to that shown in FIG. 3.

In accordance with the present invention, the device functions not as a battery but rather for the dissociation of oxides of nitrogen contained in exhaust gases. The exhaust gases are passed through the porous supporting tubes 70, and the outer air electrodes 78 are exposed to the atmosphere. A d-c potential source 80, in series circuit with a large value resistor 82 (e.g. one megohm or greater) is connected in series circuit with the reactor element electrodes for production of electric fields 84 across the solid electrolytes 74. Again, as with other arrangements of this invention, substantially no current is drawn from the d-c source because of the large resistance included in series circuit therewith. With the presence of the electric field, catalytic decomposition of $NO_x$ and CO contained in the exhaust gases takes place on the solid oxygen-ion electrolytes 74.

With the present invention it is hypothesized that F-centers are formed on the solid electrolyte by the electric field, which may lead to ionization of the oxygen-bearing gaseous compounds at the cathodic surface of the electrolyte, which are more readily decomposed than the neutral compounds. This is, of course, hypothesis and the invention is not limited thereto. That is, the invention is limited to the use of an electric field across the stabilized oxygen-ion oxide electrolyte, with substantially no expenditure of energy from the potential source, without explanation of the precise catalytic sequence involved in the catalysis, or limitation to any hypothesized sequence.

The invention having been described in detail in accordance with requirements of the Patent Statues, various changes and modifications will suggest themselves to those skilled in this art which are intended to fall within the spirit and scope of the invention as defined in the appended claims.

I claim:

1. In a method of catalytic dissociation of NO comprising dissociating said NO at the cathodic face of a solid non-porous stabilized oxygen-ion oxide electrolyte provided with porous cathodic and anodic electrodes at opposite faces at a temperature of from 400° to 1000° C., the anodic face of which electrolyte is exposed to air, the improvement comprising connecting said electrodes to a d-c voltage source through current limiting resistor means for impressing a unidirectional electric field through said electrolyte to provide F-centers at the cathodic face of the electrolyte for enhanced catalytic action thereat, ionic oxygen flow through said electrolyte being limited by said current limiting resistor means to a level wherein oxygen transferred through said electrolyte as oxygen ions constitutes a minor portion of the total amount of oxygen produced by dissociation of NO at the cathodic surface.

2. In a method of catalytic dissociation as defined in claim 1 wherein said NO is included as a component of exhaust gases from an internal combustion engine.

3. In a method of catalytic dissociation as defined in claim 2 including operating at a temperature of the exhaust gases from the internal combustion engine.

4. In a method of catalytic dissociation as defined in claim 1 including employing resistor means of at least one megohm resistance.

5. In a method of catalytic dissociation of NO comprising dissociating said NO at the cathodic face of a solid non-porous stabilized oxygen-ion oxide electrolyte provided with porous cathodic and anodic electrodes at opposite faces at a temperature of from about 400° to about 1000° C., the anodic face of which electrolyte is exposed to air, the improvement comprising impressing by means of a d-c voltage source a unidirectional electric field through said electrolyte by connection of said electrodes to said d-c voltage source through current limiting resistor means for enhanced catalytic action at the cathodic face of the electrolyte, ionic oxygen flow through said electrolyte of oxygen produced by dissociation of NO being limited by said current limiting resistor means to substantially less than the total amount of oxygen produced by said dissociation of NO at the cathodic face of the electrolyte.

6. Catalytic dissociation apparatus for use in catalytic dissociation of NO at a temperature of from about 400° to about 1000° C. comprising,
 a solid non-porous stabilized oxygen-ion oxide electrolyte,
 a porous cathode at one face of the electrolyte adapted for exposure to NO,
 a porous anode at the opposite face of the electrolyte adapted for exposure to air, and
 a d-c voltage source connected to said cathode and anode through series resistance means for impressing an electric field across said electrolyte to provide F-centers at the cathodic surface of the electrolyte for catalytic dissociation of NO thereat with substantially zero net flux of current through said electrolyte.

7. Catalytic dissociation apparatus as defined in claim 6 wherein said electrolyte comprises scandia-stabilized zirconia.

8. Catalytic dissociation apparatus as defined in claim 6 wherein said porous cathode and anode comprise non-noble metal.

9. Catalytic dissociation apparatus as defined in claim 6 wherein said series resistance means has a value of at least approximately one megohm resistance.

10. Catalytic dissociation apparatus for use in catalytic dissociation of NO at a temperature of from about 400° to about 1000° comprising,
 a solid non-porous stabilized oxygen-ion oxide electrolyte,
 a porous cathode at one face of the electrolyte, said one face being adapted for exposure to NO to be dissociated,
 a porous anode at the opposite face of the electrolyte, said opposite face being adapted for exposure to air,
 a d-c voltage source connected to said cathode and anode for impressing an electric field across said electrolyte to provide F-centers at the cathodic face of the electrolyte for catalytic dissociation of NO thereat,
 current limiting resistance means in series circuit with said d-c voltage source to limit oxygen-ion flow through said electrolyte to a minor portion of the total amount of oxygen produced by dissociation of NO at said cathodic surface of said electrolyte, a major portion of said oxygen produced by dissociation of NO being removed from the apparatus from the cathodic side of the electrolyte without ionic transfer thereof through said electrolyte.

11. Catalytic dissociation apparatus as defined in claim 10 wherein said electrolyte comprises scandia-stabilized zirconia.

12. Catalytic dissociation apparatus as defined in claim 10 wherein said porous cathode and anode comprise non-noble metal.

13. Catalytic dissociation apparatus as defined in claim 10 wherein said current limiting resistance means limits current drain from said d-c voltage source to an amount substantially less than current drain during operation without such current limiting resistance means.

14. Catalytic dissociation apparatus for use in the exhaust gas flow path of an internal combustion engine for decomposition of NO included in the exhaust gas, said apparatus comprising,
 a catalyst comprising a solid non-porous stabilized oxygen-ion oxide electrolyte,
 a porous cathode at one face of the electrolyte adapted for exposure to the exhaust gas,
 a porous anode at the opposite face of the electrolyte adapted for exposure to air,
 a d-c voltage source connected to said anode and cathode for impressing an electric field across said electrolyte to provide F-centers at the cathodic face of the electrolyte for catalytic dissociation of NO thereat,
 current limiting resistance means for limiting current drain from the d-c voltage source to a level at which most of the oxygen produced by dissociation of NO exits said apparatus from the cathodic face of the electrolyte without passage in oxygen-ion form through said electrolyte.

* * * * *